Jan. 14, 1941.  E. W. MILLER  2,228,968
GEAR FINISHING CUTTER
Filed Feb. 23, 1932  2 Sheets-Sheet 1
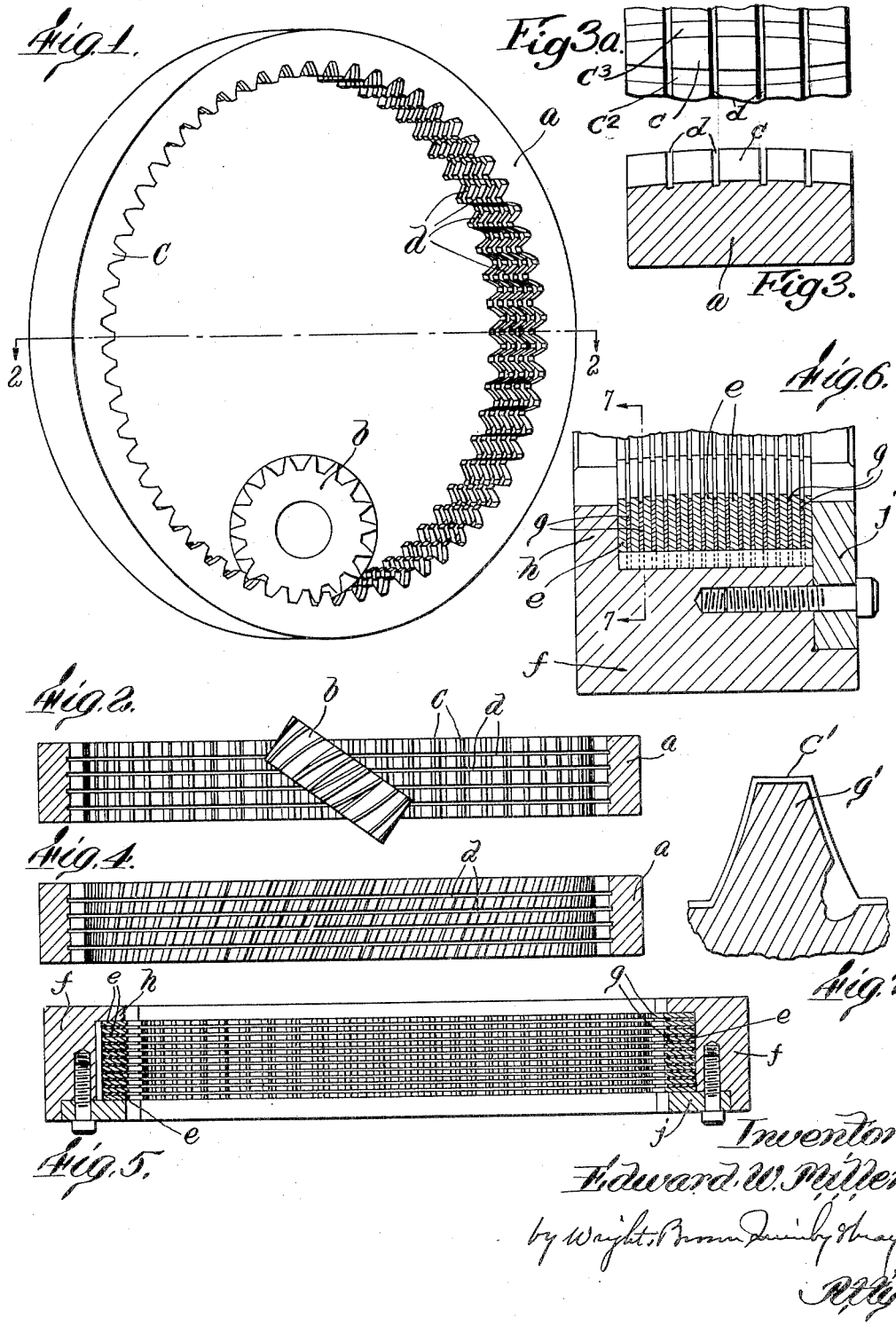

Jan. 14, 1941. E. W. MILLER 2,228,968
GEAR FINISHING CUTTER
Filed Feb. 23, 1932 2 Sheets-Sheet 2

Inventor
Edward W. Miller
by Wright, Brown, Quinby & May
Attys.

Patented Jan. 14, 1941

2,228,968

UNITED STATES PATENT OFFICE 2,228,968

GEAR FINISHING CUTTER

Edward W. Miller, Springfield, Vt., assignor to The Fellows Gear Shaper Company, Springfield, Vt., a corporation of Vermont Application February 23, 1932, Serial No. 594,422

22 Claims. (Cl. 29—108)

The present invention relates to the art of finishing gears to a high quality of perfection in the form and dimensions of their teeth. It is related to an invention of mine in that art for which I have made application for a patent, Serial No. 588,913, filed January 26, 1932, and according to which the finishing action is effected by a combination of scraper-cutting and burnishing performed by the same tool on the gear to be finished. In the disclosure of said prior application I have shown tools in the nature of external gears, both spur and helical gears, equipped in their tooth faces with alternate cutting edges and burnishing surfaces capable of removing metal from the work by the scraping action of their cutting edges and of smoothing and burnishing the work by the rubbing effect of their burnishing surfaces. The present invention involves a new form of tool capable of doing the same character of work more effectively. I have discovered that a tool in the form of an internal gear, when modified in form so that its teeth will bear evenly on the teeth of a conjugate gear whose axis is askew to the axis of the internal gear, will accomplish even better results than the tools of the invention first described. If the teeth of such internal gear tool are gashed or grooved so as to provide cutting edges interspersed between burnishing zones, the combined scraping and burnishing effect is accomplished more rapidly and with a smoother surface finish than by tools of external gear form. Likewise if the tool is made of metal suitable for lapping tools, such as cast iron, it is usable effectively as a lap; and if made of hardened steel without cutting edges, it may be used as a burnishing tool simply. In these cases also the internal gear form of tool obtains results superior to the lapping and burnishing tools of the external gear form heretofore used. The superiority in either of these characters and modes of use of the tool follows from the fact that the faces of the internal gear teeth have a much wider area of bearing on the teeth of the work piece than external gears in their action of cutting, burnishing or lapping, and that this action is transferred progressively along the teeth of the work piece in the general direction of the axis of the work piece, due to the skewed arrangement of the axes of the tool and work piece.

However, it has been heretofore considered impossible to run an external gear in mesh with an internal gear when the axes are askew, because of interference difficulties at or adjacent to the ends of the teeth of these gears. I have discovered means for modifying the teeth of the internal gear which I use as the tool so that they will bear equally and uniformly from end to end of the teeth of an external gear on a skewed axis, and thus finish the teeth of the gear from one end to the other without requiring any axial traverse of the gear being finished.

The invention comprises the novel tool above outlined and hereinafter described in detail, and a method of effecting such modification from the tooth forms of a normal internal gear as will enable the tool thus to run in correct mesh with the gear being finished.

In the drawings,

Fig. 1 is a perspective view of a tool embodying this invention in operative engagement with a helical gear.

Fig. 2 is a sectional plan view taken on line 2—2 of Fig. 1.

Fig. 3 is a sectional view of the tool taken on a radial plane and shown on a larger scale.

Fig. 3a is a plan view of the tooth shown in Fig. 3, represented on the same scale as Fig. 3.

Fig. 4 is a view similar to Fig. 2 showing the tool made as a helical internal gear for finishing spur gears.

Fig. 5 is a view similar to Fig. 2 showing the tool made of laminated construction, but otherwise substantially the same as the first described tool.

Fig. 6 is a section of the tool shown in Fig. 5, taken on a radial plane, and shown on an enlarged scale.

Fig. 7 is a detail sectional view taken on line 7—7 of Fig. 6.

Figure 8:
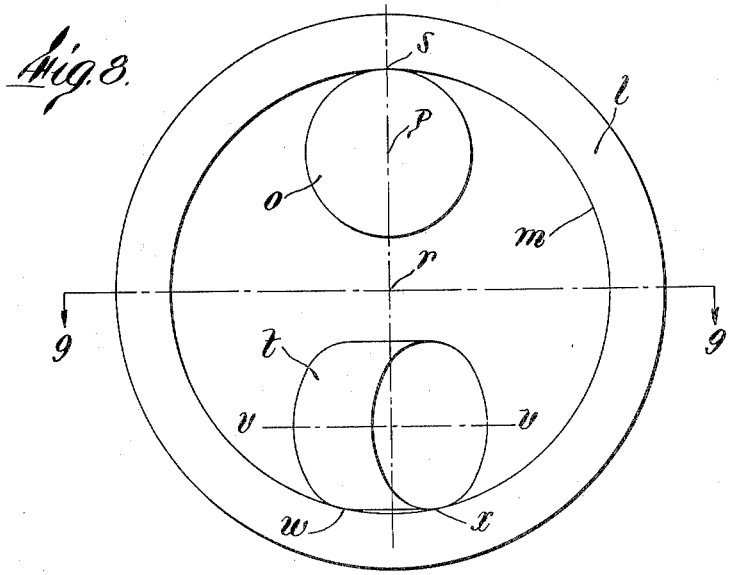
Fig. 8 is an elevation of external and internal rolling cylinders illustrating the principles according to which the tool of the present invention is generated to mesh with a gear on a skewed axis.

Referring first to Figs. 1 and 2, *a* represents a tool provided to finish helical gears, one of which is represented at *b*, by a combined scraping and burnishing action. The tool *a* is similar to an internal gear in that it has teeth *c* projecting from its inner circumference, the form of which in planes perpendicular to the axis is conjugate to the tooth form of gear *b*. In this respect the teeth of the tool may be designed and generated according to known methods of gear generation. That is, for instance, if the gear *b* is an involute gear, the tooth faces of the tool are conjugate involute curves. Such faces are intersected at intervals by grooves or slots d d, the boundaries of which form cutting or scraping edges. Such grooves may be in planes perpendicular to the axis of the tool and of a depth to extend continuously from the points to the roots of the teeth, or they may extend in helical paths or other directions inclined to the length dimension of the teeth. When the teeth of the tool are helical, the grooves are preferably helical also, normal (perpendicular) to the tooth helices. Fig. 2 shows a form of tool in which the grooves are perpendicular to both its axis and its teeth, the latter being straight.

It may be remarked at this point that wherever in the present description I refer to the length of a tooth, whether a tooth of the tool or one of the gear being finished, I mean the dimension from one end face or side of the gear (or the tool) to the other end face. That is, in a straight tooth gear or tool this dimension is parallel to the axis of the gear or tool, while in one having helical teeth the length dimension is along the lead of the helix, which is still in the general direction of the axial length of the gear. What I intend to make plain by this explanation is that "length" as here used has no reference whatever to the height of a tooth from root to tip, which in some circumstances is considered as its length.

The grooves d or gashes previously referred to may be cut by any suitable means before the tool has been hardened; and, after hardening, their side walls may be ground off so as to make sharp cutting edges where they intersect the side faces of the teeth. When such a tool is put in mesh with a helical gear, the axis of the tool and gear being then askew to one another at an angle conforming to the helical angle of the gear, and the tool is rotated about its own axis, it drives the gear, and at the same time the cutting or scraping edges travel lengthwise of the teeth of the gear, due to the divergent paths in which the two elements rotate, thereby scraping off irregularities and excrescences in the tooth faces of the gear, while the faces of the teeth of the tool in the zones intermediate such edges press and rub the teeth of the gear, further moulding the latter to true form and obliterating cutter marks or other defects not removed by the scraping edges. It is to be understood that for doing this work the tool is mounted on a suitable holder and the work piece on a suitable work spindle, in a machine having provisions for adjusting the tool holder and work spindle to the proper skew angle, means for driving the tool holder rotatably, and means for exerting a drag on the work piece to effect any desired degree of cutting and rubbing pressure thereon by the tool.

The relatively close approximation of the tooth curves in the tool to the tooth curves in the work causes a smoothness and perfection of finish in the work superior to the results obtainable with external gear forms of tool, where the zone of possible contact is so much narrower. Evidently a more pronounced cutting and rubbing effect is obtainable where the skew angle is large, that is, upon gears of a large helix angle, than upon gears of small helix angle. But in cases where the helix angle is small, or the work piece is a straight spur gear, the tool may be provided with helical teeth of the opposite hand to that of the gear, and with a helix angle sufficient to obtain for any desired degree of divergence between the tooth orbits of the tool and the work piece.

A tool having helical teeth designed for the latter purpose and for finishing straight toothed gears is shown in Fig. 4. The gashes in the teeth of this tool need not be in planes perpendicular to the axis, as shown, but may be normal to the tooth helices, or otherwise arranged. Except for these differences, the tool shown in Fig. 4 may be the same as that shown in Figs. 1 and 2.

Another mode of providing cutting edges at intermediate points between the ends of the teeth, which may be used with either the straight toothed or helical toothed form of tool, is shown in Figs. 5, 6 and 7. Here the tool is formed by a series of internally toothed rings e, e, set up side by side in a gang within a holder ring f, with intermediate spacer rings g, and pressed against an end flange h by means of a clamp ring j which is bolted to the holder ring. The teeth c' of the several rings e e are alined with one another either parallel to the axis of the composite tool, or helically around such axis, and their side faces form burnishing zones analogous to those previously described, while their edges form scraper-cutting edges, similar to those previously described. Preferably the spacer rings g are notched so as to provide projections g' similar in outline, but of smaller dimensions than the teeth c' of the rings e, as shown by Fig. 7, and the flange h and clamp plate j are similarly notched. Thus is afforded a support for the teeth of the relatively thin cutter rings. The latter, after having been finish-cut in the gang assemblage, and hardened, may be disassembled for sharp grinding on their side faces, and re-assembled.

In order to make perfect mesh between the tool and the work, in spite of the skew angle between their axes, the tool is modified from the characteristics of the ordinary (normal) internal gear by giving the teeth a somewhat bowed formation longitudinally. That is, the teeth are somewhat thicker, and may also be higher, in the middle than at the ends (considering the height of a tooth to be its dimension from the root circumference toward the axis of the tool), and the decrease in thickness and height from the middle to both ends of the teeth follows curved lines. The amount of this bowed formation, not great in any case, varies according to the skew angle and the length in the axial direction of the tool. Its exact character is described in connection with the following description of a means which I have found satisfactory to give the character and degree of bowed formation required in any case.

Figure 9:
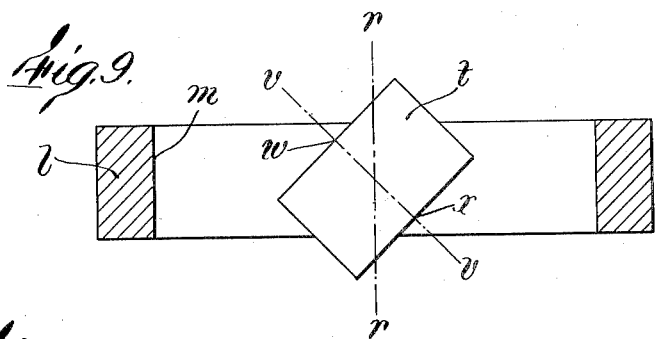
Fig. 9 is a horizontal section on line 9—9 of Fig. 8.

The reason why perfectly correct mesh is not possible without the formation referred to, between skewed internal and external gears, is explained diagrammatically by Figs. 8 and 9. In these figures l represents a ring having an internal cylindrical surface m which may be considered as the pitch cylinder of an internal gear. If a cylinder o is placed within such a ring so that its axis p is parallel with the axis r r of the ring and its circumference is against surface m, it will make tangent contact with the latter on a line s parallel to the axes p and r throughout the entire length common to both cylinders. But if this or any other cylinder, as t, is arranged with its axis v v askew to the axis of the ring, it can make contact with the surface m at only two points, as w and x, and between these points the element w—x of its circumference is separated from the surface m.

The fact thus shown diagrammatically is borne out by experience, for it has been found that gears arranged with their pitch cylinders in a similar relationship to that of the cylinder t and surface $m$, bear hard or interfere at or near the ends of their teeth, without coming into bearing at all in their middle parts.

Figure 10:
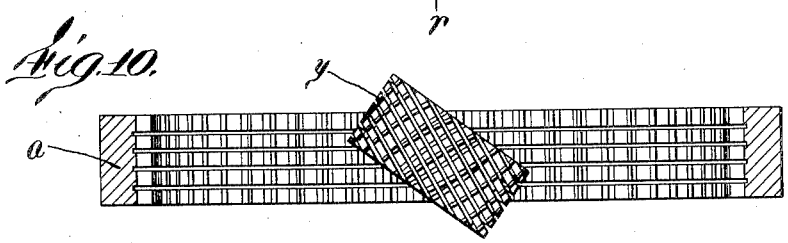
Fig. 10 illustrates the method of bringing a tool of internal gear character into the condition described.

The cutter of my invention avoids such end interference and has a uniform bearing with the skewed gear throughout the common length of their teeth. I have devised a mode of generating the tooth formation which accomplishes this result by making a cutter, shown as cutter $y$ in Fig. 10, which is in the form of an external helical gear having teeth of the same pitch and pressure angle as the gear $b$, but grooved or gashed in lines perpendicular to the tooth helices, and hardened, to furnish cutting edges and intermediate burnishing surfaces. In other words, the tool $y$ is of the same generic character as the helical toothed forms of tool shown in my pending application before referred to, and is specifically like the work piece $b$ in other particulars. The tool $a$ having been originally cut as an internal gear with straight unbowed teeth, is run in mesh with the cutter $y$ until its teeth are cut away at the ends, and from the ends toward the middle, far enough to obtain a continuous lengthwise bearing or contact with the teeth of said cutter $y$ throughout the length in common of the mating teeth. In the course of this action the teeth of the cutter $y$ penetrate more and more deeply into the spaces between the teeth of tool $a$ until they come into full bearing with the latter at points which, in their revolution, pass through the diameter common to both the tool $a$ and cutter $y$. Such common diameter is the diameter of the tool $a$ which intersects the axis of the cutter $y$. It corresponds to the vertical diameter of the ring $l$ shown in Fig. 8 and to a line perpendicular to the plane of the drawing passing through the intersection of the diameters $r, r$ and $v, v$ in Fig. 9.

In consequence of such progressive penetration, the cutter teeth scrape and smooth the sides of the tool blank teeth $c$ to a longitudinally curved, bowed, or crowned form at their side faces, substantially as shown in Fig. 3a, and the curvatures of the opposite faces of each tooth are opposite to one another. That is, the tooth face $c^2$ is of opposite curvature to the face $c^3$, both being convex lengthwise. At the same time, if the cutter $y$ is made without top and bottom clearance with respect to the tool blank, the tops of the teeth and bottoms of the tooth spaces of the latter are bowed or crowned with a convex curvature toward the center of the annular tool, substantially as shown in Figs. 3 and 6.

The shape thus imparted to the teeth of the tool $a$ enables it to have continuous lengthwise bearing, when put into operation with a gear blank, throughout the length of the teeth of the work piece $b$. Gashing to provide the intermediate cutting edges described, and hardening, then completes the tool. This description of the procedure in making a specific tool defines both the characteristics of the tool as completed and a suitable method of generating or forming it. Essentially the same method, differing only in the specific details of the cutter, may be employed to make tools like the tool $a$ for finishing gears of different helix angles than that of the gear $b$, and to complete internally toothed tools with helical teeth. The sides of such helical tool teeth are likewise crowned or convex oppositely to one another with this difference, that the convexity is related to helical center lines, or central helicoids, instead of to straight center lines or diametral planes midway between the sides of the teeth, as in the case of the straight toothed tools.

The same procedure is applicable also for the finish generation of laminated tools of the type shown in Figs. 5–7, whether the teeth of such tools are straight or helical. Like results are obtainable also by passing a gear shaper cutter through the tool on a line askew to the axis of the tool similarly to the skew angle previously described; using a helical cutter and giving it a twisting motion when so finishing a tool of the character shown in Figs. 1, 2, 5 and 10.

Certain characteristics of the tool above described are novel, whether the tool is made as a combined scraper-cutter and burnisher, or as a burnisher alone, or as a lap. I refer now particularly to the formation which produces uniform tooth bearing throughout the length of the gear arranged on a skewed axis. These characteristics I claim broadly in all their embodiments, for the various uses of cutting or scraping, burnishing, singly or jointly, and lapping. But I also claim the scraper-burnisher species of internally toothed tool independently of the bowed tooth formation; inasmuch as this formation may be omitted in cases where the length of the gear being finished is so short, or the skew angle so small, that the uneven bearing is inappreciable. A very important advantage of the invention in all its manifestations is that it enables the gear operated on to be finished without any axial reciprocation of either the work piece or the tool, provided only the tool is long enough to extend beyond both ends of the teeth of the gear when they pass the operating point; such point corresponding to the pitch point between a similar pair of meshing gears. This conduces in practice to rapid production of finished work. However, there is nothing in the use of this tool incompatible with such an axial traverse, and it may be employed wherever desired.

What I claim and desire to secure by Letters Patent is:

1. A gear finishing tool in the form of an internal gear having teeth bowed from end to end with convexity toward the axis of the tool.

2. A gear finishing tool in the form of an internal helical gear with its teeth bowed lengthwise on a curvature convex toward the axis of the tool.

3. A gear finishing tool composed of internally toothed rings, intermediate spacing rings between adjacent rings, and means securing said rings together in unit assemblage; the teeth of said toothed rings extending inwardly beyond the inner boundaries of the spacer rings and being centrally alined with one another in the axial direction of the composite structure and their side faces being segments of curves which are convex in such axial direction.

4. A gear finishing tool having gear teeth which are bowed from end to end with symmetrical and opposite lengthwise curvature on opposite side faces, the faces of said teeth being interrupted at intervals to provide scraping edges transverse to the length of the teeth and smooth burnishing surfaces intermediate such edges.

5. A gear finishing tool in the form of a gear wheel with teeth bowed from end to end with convex endwise curvature at opposite sides, relative to their longitudinal center lines, the faces of said teeth being interrupted at intervals to provide scraping edges transverse to the length of the teeth and smooth burnishing surfaces intermediate such edges.

6. A gear finishing tool in the form of a gear wheel with teeth bowed from end to end with equal and opposite endwise convex curvature relatively to the longitudinal center lines of the teeth, the faces of said teeth being interrupted at intervals to provide scraping edges transverse to the length of the teeth and smooth burnishing surfaces intermediate such edges.

7. A gear finishing tool in the form of an internal gear having teeth bowed from end to end with convexity toward the axis of the tool, the faces of said teeth being interrupted at intervals to provide scraping edges transverse to the length of the teeth and smooth burnishing surfaces intermediate such edges.

8. A gear finishing tool adapted to rotate in use about an axis and having a plurality of teeth extending beside one another generally in the direction of such axis, the sides of said teeth providing finishing surfaces and being bowed longitudinally with relatively opposite curvatures at opposite sides of said teeth.

9. A gear finishing tool adapted to rotate in use about an axis and having a plurality of teeth extending beside one another generally in the direction of such axis, the sides of said teeth providing finishing surfaces and being bowed longitudinally with convex curvature on both faces.

10. A gear finishing tool in the form of an internal gear having teeth bowed from end to end with convexity toward the axis of the tool and with their side faces convex in the direction of their length.

11. A gear finishing tool in the form of an internal gear having teeth extending side by side in the general direction of the axis of the tool, such teeth having side faces which are concave in planes normal to their length and are convex lengthwise.

12. A gear finishing tool having teeth adapted to run in mesh with a work gear when placed with its axis at an inclination to, and in a different plane from, the axis of such work gear, which teeth are of such longitudinally bowed curvature in their sides as to bear throughout a large proportion of their length in common with the teeth of the work gear.

13. A gear finishing tool having teeth adapted to run in mesh with a work gear when placed with its axis at an inclination to, and in a different plane from, the axis of such work gear, which teeth are of such longitudinally bowed curvature in their sides as to bear throughout a large proportion of their length in common with the teeth of the work gear, and are interrupted by gaps providing longitudinally separated cutting edges, the faces of such teeth between said cutting edges being burnishing surfaces.

14. A gear finishing tool having teeth adapted to run in mesh with a work gear when placed with its axis nonintersecting and inclined to the axis of such work gear, which teeth are of such longitudinally bowed curvature in their sides as to bear both in their mid length portion on the teeth of the work gear and with an extended bearing toword either end from such mid portion.

15. A gear finishing tool having teeth adapted to run in mesh with a work gear when placed with its axis nonintersecting and inclined to the axis of such work gear, which teeth are of such longitudinally bowed curvature in their sides as to bear both in their mid length portion on the teeth of the work gear and with an extended bearing toward either end from such mid portion, said teeth having cutting edges intersecting their sides.

16. A gear finishing tool comprising a plurality of axially alined cutter units secured together separately and each having a series of teeth generally similar to gear teeth but formed with longitudinally bowed side faces, the teeth of said respective units having cutter edges at the ends nearest to the next adjacent unit and being so alined that the corresponding side faces of the teeth of the respective units are continuations of the same curves.

17. A gear finishing tool having teeth adapted to run in mesh with a work gear when placed with its axis nonintersecting and inclined to the axis of such work gear, which teeth are of such longitudinally bowed curvature in their sides as to bear both in their mid length portion on the teeth of the work gear and with an extended bearing toward either end from such mid portion, said tool being composed of a plurality of cutter units separably connected to one another in axial alinement and spaced apart in such manner that an intervening space exists between the contiguous ends of their respective teeth, the teeth having cutting edges at opposite sides of such space.

18. A tool for shaping gear teeth, having a series of similar teeth arranged side by side around an axis with spaces between them and their length extending generally in the direction of such axis, said teeth having cutting edges in their sides and being crowned so that such cutting edges lie in curves extending lengthwise of the teeth and of which the curvatures at opposite sides of each tooth are opposite to one another.

19. A tool for shaping gear teeth, having a series of similar teeth arranged side by side around an axis with spaces between them and their length extending generally in the direction of such axis, said teeth having cutting edges in their sides and being crowned to have less thickness at either end than in their mid-length portion.

20. A tool for shaping gear teeth, having a series of similar teeth arranged side by side around an axis with spaces between them and their length extending generally in the direction of such axis, said teeth having cutting edges in their sides and being crowned so that such cutting edges all lie in convex curves.

21. A tool for shaping gear teeth, having a series of similar teeth arranged side by side around an axis with spaces between them and their length extending generally in the direction of such axis, said teeth having cutting edges in their sides and being crowned so that the side faces adjacent to said edges form segments of continuous curves, of which the curves at opposite sides of each tooth are convergent from the middle portion toward each end.

22. A gear finishing tool comprising a plurality of internally toothed units secured separably together in axial alinement with the teeth of each in central alinement with the corresponding teeth of the adjacent unit, said teeth being conjugate in all parts of their length to the teeth of a given external work gear, the contiguous ends of such alined teeth being separated from one another by an intervening space and having cutting edges capable of being sharpened by grinding of such ends, the sides of such teeth being longitudinally bowed with opposite and substantially symmetrical curvatures, of which the curves of each tooth are continuations of the corresponding curves of the alined tooth.

EDWARD W. MILLER.